M. L. LETROTEUR.
MOTOR PLOW.
APPLICATION FILED JAN. 14, 1919.
1,337,929.
Patented Apr. 20, 1920.
2 SHEETS—SHEET 1.
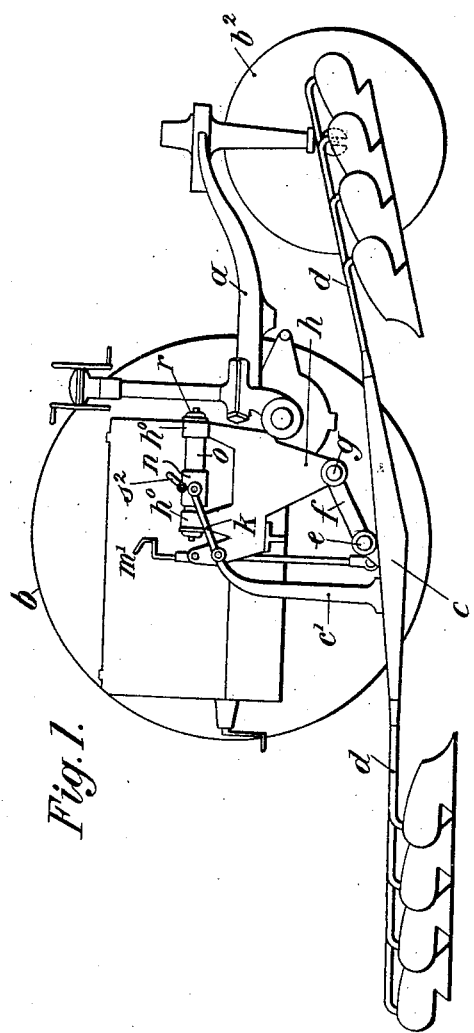

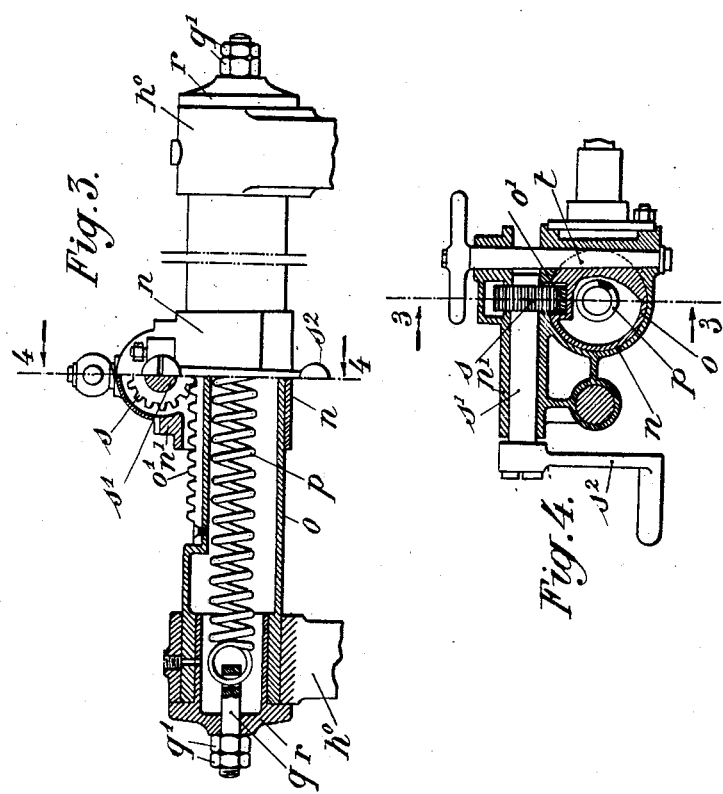

UNITED STATES PATENT OFFICE.

MAURICE LOUIS LETROTEUR, OF PARIS, FRANCE.

MOTOR-PLOW.

1,337,929. Specification of Letters Patent. Patented Apr. 20, 1920.

Application filed January 14, 1919. Serial No. 271,144.

*To all whom it may concern:*

Be it known that I, MAURICE LOUIS LETROTEUR, a citizen of the Republic of France, manufacturer, of 7 Rue Montaigne, Paris, France, have invented new and useful Improvements in Motor-Plows, of which the following is a specification.

The invention relates to motor-driven plows and more particularly to that kind of implement called a balanced plow, *i. e.* a double swing-plow, wherein the blades or shares are mounted on a main frame adapted to be raised or lowered independently of its swinging movement. A plow of this kind is described in applicant's United States Letters Patent No. 1,266,502, dated May 14, 1918.

The object of the invention is to provide this kind of double swing-plow with a shock-absorbing device, having for its function to automatically establish a yielding connection between the frames carrying the blades or shares and the main frame of the plow.

Where a rigid connection exists between the plow and the tractor, should the front wheel happen to fall into a furrow or ascend a knoll or rising in the ground that would be immediately followed either by a lifting of the blades of the plow at work or by an increase in the pressure of these blades upon the ground, the result would be sinuous working.

According to the invention, this drawback is remedied by interposing, between the frame of the tractor and the controlling lever or member, a device adapted to absorb the shocks due to jolts and furthermore to allow the blades of the plow at work to rise up should the plow encounter any obstacle.

The invention is illustrated in the accompanying drawings, wherein certain parts are designated by the same reference signs as in the aforementioned Letters Patent.

Figure 1 is a side elevation of the plow.

Fig. 2 is a top view of the same.

Fig. 3, on a larger scale, illustrates the construction of the shock-absorbing device, the figure being a partial section on the line 3, 3 of Fig. 4.

Fig. 4 is a transverse section of Fig. 3, along the line 4, 4.

As in the former construction, $a$ is the main frame mounted on two driving wheels $b$ $b'$ and a guiding wheel $b^2$. This frame carries the motor and the power transmitting and steering members, which are not shown. A double steering arrangement is provided, also two seats located opposite to each other, the forward or backward movement being obtained in any suitable manner. $c$ is the frame swinging on an axis $e$ and to which are fixed frames $d$ carrying the blades or shares. The said frame $c$ is provided with an upwardly extending rigid arm $c'$. The axis $e$ is connected to the main frame $a$ by a link $f$ pivotally fastened at $g$. A link $k$ is pivoted at one end to the arm $c'$ and, at its other end, to the movable element of a shock absorber. As shown herein, the preferred form of said element consists of a sleeve $n$ adapted to slide longitudinally upon a cylinder $o$ which is mounted to slide, at its ends, in bearings $h^o$, $h^o$ at the upper portion of the bracket $h$ supporting the axis $g$.

Within the cylinder $o$ is a helical spring $p$ fastened, by eye-bolts $q$ provided with nuts $q'$ enabling the tension of the spring to be regulated, to caps $r$ that frictionally fit the opposite ends of the cylinder $o$ and abut against the outer faces of the bearings $h^o$.

At the top of the cylinder $o$ is a rack $o'$ into which gears a pinion $s$ keyed upon an axis $s'$ adapted to rotate in a bearing $n'$ provided on the sleeve $n$. At its outer end, the axis $s'$ is provided with a handle $s^2$ by means of which a rotary movement can be imparted to it, so as to cause the pinion $s$ to roll upon the rack $o'$ and thus displace the sleeve $n$ along the cylinder $o$ so as to act, through the medium of the link $k$, upon the arm $c'$ and cause the oscillation of the frame $c$ in order to bring the plow blades into the desired position. When the sleeve $n$ has once attained the position that it ought to occupy on the cylinder $o$, it may be fixed in position by means of a pintle $t$ which is passed through the sleeve $n$ and the cylinder $o$, so as to lock these two parts together, see Fig. 4.

If, in working, the plow should encounter an obstacle either when running forward or backward, the jolt resulting therefrom to the plow shares is transmitted, through the frame $c$, the arm $c'$ and the link $k$, to the sleeve $n$ which, as it is fixed upon the cylinder $o$, carries the same along with it in opposition to the spring $p$, one end of which is drawn out by the cap $r$ situated at the end of the cylinder toward which the movement of the cylinder is directed, the other end of the spring being retained by the other cap $r$ bearing against the corresponding bearing $h^o$. In this way, while maintaining the connection of the plow members $c$, $d$ with the frame $a$ of the tractor, so as to insure the advantage of properly striking the ground, the difficulties which occur when tilling with a machine having a rigid connection between the said plow members and the frame are automatically avoided, owing to the elasticity of the spring.

Finally it will be readily understood that the invention is not strictly limited to the exact arrangement hereinbefore described and shown, by way of example, in the accompanying drawings; but that, without departing from the invention, modifications may be made in the constructional details of the apparatus and of its various members, or certain members may be replaced by equivalent mechanical devices.

Claims:

1. In a plow, a main frame, a double swing plow suspended from said frame, and means carried by said swing plows for permitting movement of said plows relative to said frame.

2. In a plow, a main frame, a double swing plow suspended from said frame, means carried by said swing plows for permitting movement of said plows relative to said frame, and means for adjusting the position of said plows relative to said frame.

3. In a plow, a main frame, a double swing plow suspended from said frame and means comprising pivotally connected supporting arms and a spring-pressed cushioning sleeve for establishing a yielding connection between said plows and said frame.

4. In a plow, a body frame, double swing plows suspended therefrom and means carried by said frame and connected to said plows for adjusting said plows relative to the surface to be worked, and cushioning means interposed between said plows and said frame.

5. In a plow, a body frame, plows pivotally connected to said frame and means comprising a spring-pressed shock obsorbing device pivotally connected to said frame, and means connected to said frame to permit movement of said sleeve relative to said body.

MAURICE LETROTEUR.